(12) United States Patent
Bin Abdullah et al.

(10) Patent No.: US 12,738,806 B2
(45) Date of Patent: Sep. 15, 2026

(54) SYSTEM FOR CLEAN, RENEWABLE AND SUSTAINABLE POWER GENERATION

(71) Applicant: EKO KUASA TECHNOLOGY SDN BHD, Puchong (MY)

(72) Inventors: Muhammad Sir Raphael Bin Abdullah, Puchong (MY); Koh Yung Lee, Puchong (MY)

(73) Assignee: EKO KUASA TECHNOLOGY SDN BHD, Puchong (MY)

( * ) Notice: Subject to any disclaimer, the term of this patent is extended or adjusted under 35 U.S.C. 154(b) by 175 days.

(21) Appl. No.: 18/688,743

(22) PCT Filed: Aug. 30, 2022

(86) PCT No.: PCT/MY2022/050078
§ 371 (c)(1),
(2) Date: Mar. 1, 2024

(87) PCT Pub. No.: WO2023/033642
PCT Pub. Date: Mar. 9, 2023

(65) Prior Publication Data

US 2024/0291352 A1 Aug. 29, 2024

(30) Foreign Application Priority Data

Sep. 3, 2021 (MY) ............................ PI2021005066

(51) Int. Cl.
*H02K 7/20* (2006.01)
*H02K 7/02* (2006.01)
(Continued)

(52) U.S. Cl.
CPC ................ *H02K 7/20* (2013.01); *H02K 7/02* (2013.01); *H02K 7/116* (2013.01);
(Continued)

(58) Field of Classification Search
CPC . H02K 7/20; H02K 7/02; H02K 7/116; H02K 11/0094; H02K 11/04; H02K 53/00;
(Continued)

(56) References Cited

U.S. PATENT DOCUMENTS

2007/0029889 A1* 2/2007 Dunn .................... H02K 53/00 310/156.01
2011/0234036 A1* 9/2011 Torres ................... H02K 53/00 74/DIG. 9
(Continued)

FOREIGN PATENT DOCUMENTS

KR 10-2087930 B1 3/2020
KR 10-2195432 B1 12/2020

OTHER PUBLICATIONS

International Search Report for corresponding International Patent Application No. PCT/MY2022/050078, dated Dec. 22, 2022.

*Primary Examiner* — Ahmed Elnakib
(74) *Attorney, Agent, or Firm* — LOZA & LOZA, LLP; Michael Fedrick

(57) ABSTRACT

A system for power generation including: at least one power source operable to static start at least one machine device to rotate a drive shaft and; ii) at least one synchronous generator having a stator with winding field coils, said stator being surrounded by a rotor with an array of magnetic field generating means. The drive shaft is a joined shaft, operable to synchronously rotate the rotor of the at least one synchronous generator, and is equipped with a flywheel having a plurality of arrays or evenly spaced around magnetic field means adapted to be magnetically interaction with energizing coils so as to induce rotation of the flywheel in a single direction to rotate the rotor The synchronous generator is adapted to convert a rotational speed of the rotor to electric current through cross magnetic field excitation between the stator and the rotor.

20 Claims, 4 Drawing Sheets

(51) Int. Cl.
*H02K 7/116* (2006.01)
*H02K 11/00* (2016.01)
*H02K 11/04* (2016.01)
*H02K 53/00* (2006.01)

(52) U.S. Cl.
CPC ......... *H02K 11/0094* (2013.01); *H02K 11/04* (2013.01); *H02K 53/00* (2013.01)

(58) Field of Classification Search
CPC . H02K 7/14; H02K 7/18; H02K 21/22; H02P 9/48; Y02E 60/16
USPC .......................................................... 310/113
See application file for complete search history.

(56) References Cited

U.S. PATENT DOCUMENTS

| | | | | |
|---|---|---|---|---|
| 2013/0099703 | A1* | 4/2013 | Epstein | H02K 53/00 310/68 B |
| 2017/0170762 | A1* | 6/2017 | Blackwelder | H02P 9/08 |
| 2019/0319520 | A1 | 10/2019 | Bailey | |
| 2019/0341827 | A1* | 11/2019 | Fung | H02K 5/16 |
| 2020/0088156 | A1 | 3/2020 | Han | |
| 2020/0158095 | A1* | 5/2020 | Kononewsky | H02K 53/00 |
| 2020/0195120 | A1* | 6/2020 | Yu | H02K 11/0094 |
| 2021/0215129 | A1 | 7/2021 | Burkle | |

* cited by examiner

SYSTEM FOR CLEAN, RENEWABLE AND SUSTAINABLE POWER GENERATION

CROSS-REFERENCE TO RELATED APPLICATIONS

This application is the U.S. national stage of International Patent Application No. PCT/MY2022/050078, filed on Aug. 30, 2022, which claims the benefit of priority under 35 U.S.C. § 119 from Malaysian Patent Application No. PI202 1005066, filed on Sep. 3, 2021. The disclosures of the foregoing applications are incorporated herein by reference in their entireties.

FIELD OF INVENTION

The present invention relates to a system for power generation, and more particularly to a system for clean, renewable and sustainable power generation.

BACKGROUND OF INVENTION

Global warming has become a very critical and important issue during the last decade. One of the reasons was due to the weighty usage of fuel power machines around the globe. Conventional fuel power machines such as fossil fuel generators are of debatable utility to meet future electricity demands as they are the major emitters of carbon dioxide ($CO_2$) that contribute to the greenhouse effect, believed to be among the principal contributors to climate change and air pollution. These human-caused greenhouse gas emissions could be a major contributor to global warming. Moreover, mankind is in order to obtain the high demand of the fuel sources, proposes of earth's crust, extraction and excavation to the earth may substantially cause serious air pollution, natural and ecological unbalance such that leaving to an unhealthy environment with increasing threat and challenge.

In order to mitigate air pollution and climate change, an effective clean, renewable and sustainable energy approach are required to meet the energy demand for future usages. In view of this, worldwide research gradually oriented to obtain efficiency improvements on energy-consuming and sustainable energy source utilization.

In some conventional design paradigms, certain drawbacks may be detected from the operation of some conventional clean, renewable and sustainable source machine generators. Among the drawbacks may include, such as for example, but not limited to, the instability of the machine generator, difficulty in maintaining as it requires exertion work in maintenance, substantial vibration due to occurrence of resonances, unstable and/or inefficiency in power output. As such, special care is needed to safeguard the proper operation of the machine generator.

Various attempts have been made to improve the stability and efficiency of the machine generator. However, most attempts have not been completely satisfactory for one or more reasons. For example, some machine generators are unsatisfactory due to their complex designs, configurations, materials, or parts that appear to have certain drawbacks, such that they have not become widely used. Some other attempts may involve a significant cost to mitigate resonances and to ensure the proper operation and working effectiveness of the machine generator, such that it may require excessive supervision in maintenance. Moreover, certain parts of the machine generator may be too compact and unreachable such that making the maintenance work even more challenging and time-consuming.

In view of the foregoing and other shortcomings, it is desirous to provide an effective system for clean, renewable and sustainable power generation, and yet enabled to overcome the aforementioned limitations and drawbacks. Accordingly, the present invention is adapted to overcome one or more of the foregoing drawbacks and the issues relative to the conventional designs or prior arts in an efficient and cost-effective manner. The present invention and its combination of features thereof will be described and exemplified in the detailed description.

SUMMARY OF THE INVENTION

The present invention relates to a system for clean, renewable and sustainable power generation. Accordingly, the system includes: i) at least one power source operable to static start at least one machine device to rotate a drive shaft; ii) at least one synchronous generator having a stator with winding field coils, said stator being surrounded by a rotor with an array of magnetic field generating means; wherein the drive shaft is a joined shaft, operable to synchronously rotate the rotor of the at least one synchronous generator; said drive shaft is equipped with a flywheel having a plurality of arrays or evenly spaced around magnetic field means adapted to be magnetically interaction with energizing coils so as to induce rotation of the flywheel in a single direction to rotate the rotor; and wherein the synchronous generator is adapted to convert a rotational speed of the rotor to electric current through cross magnetic field excitation between the stator and the rotor, such that said synchronous generator is operable to supply electric power back to the at least one machine device in a closed-loop energy system, or to channel the electric power to at least one power output as a power source for other electrical devices.

In the preferred exemplary of the present invention, the power source includes electrical supply from at least one power storage in the closed-loop energy system. It will be appreciated that the power source may optionally obtain from an auxiliary electrical supply. By way of example but not limitation, the power storage may include one or more rechargeable batteries storage or other applicable forms of power storage. The auxiliary electrical supply may include electrical supply from direct power source terminal or other applicable forms of power supply.

In the preferred exemplary, the electrical supply is preferably, but not limited to be managed by at least one controller. Said controller is operable to control the speed of the drive shaft. Preferably, but not limited to, the controller is an alternating current, AC controller. It will be appreciated that the closed loop energy system of the present invention is preferably, but not limited to be managed by a microcontroller.

In the preferred exemplary of the present invention, the at least one machine device is adapted to alternatively function as a motor or a generator. Accordingly, the at least one machine device is adapted to be temporarily operated as a motor with the electrical supply from the power source; so as to static start the drive shaft to accelerate rotational speed to sufficiently start the synchronous generator. The at least one machine device may then be switched back to operate as a generator; once the synchronous generator begins operable to supply electric power back to the at least one machine device through the at least one controller in the closed-loop energy system.

In the preferred exemplary of the present invention, the stator of the at least one synchronous generator includes an armature having a plurality of winding field coils evenly spaced apart around its circumference projected winding teethes. Accordingly, each winding field coil is preferably, but not limited to be winded to each winding teeth and evenly spaced apart around the circumference of the armature. It should be noted that each winding field coil is adapted to be served as a collecting energizing coil or an electromagnet coil. Accordingly, said winding field coil is adapted to be energized by back electromotive force (EMF) more than once in a single revolution of the rotor.

It should be noted that the rotor of the at least one synchronous generator may include an array of the magnetic field generating means evenly spaced apart around at its inner circumference surface. By way of example but not limitation, the magnetic field generating means of the rotor may preferably be a permanent magnet of an iron core or a means attractable to a magnetized body, with north-south polarity.

It will be appreciated that the rotor of the at least one synchronous generator may preferably equip with one or more clip blade fans configured on at least one space opening of the rotor for ventilation purposes. Accordingly, the clip blade fan is adapted to provide an aerodynamic airflow through the at least one space opening of the rotor, such that it is able to reduce the temperature of the winding field coils of the stator. It will be appreciated that the rotor of the at least one synchronous generator is adapted to be served as a flywheel so that it is able to eliminate the magnetic flux friction caused by the sudden load, hence lighten the rotation of the rotor.

It should be noted that whenever the rotational speed of the drive shaft is increased, the rotor of the synchronous generator, which also serves as a flywheel, will be accelerated to its rated starting speed. Such starting speed of the rotor enabled the synchronous generator to become self-sustaining to generate electric power to drive the machine device through the at least one controller or to channel out the electric power as a power source for other electrical devices.

It should be noted that the magnetic field means of the flywheel of the present invention may be a permanent magnet of an iron core, or an energize able coils simulating magnets, with the same polarity. Preferably, but not limited to, the energizing coil of the present invention may be an electromagnet.

In the preferred exemplary of the present invention, the electric current is being formed by the cross magnetic field excitation which is a result of periodic alignment and misalignment of magnetic poles with north-south polarity in-lines provided on the rotor and the stator of the synchronous generator. Accordingly, the cross magnetic field excitation includes magnetic wave kink flux.

It should be noted that a direction of the magnetic wave kink flux supplied on to the winding field coil of the stator in the magnetic poles with north-south polarity arrangement must be synchronized, meaning that the magnetic field from the magnetic field generating means of the rotor as needed in the winding field coil of the stator for cross magnetic field excitation must be of the corresponding polarity to the winding field coil of the stator. Accordingly, the winding field coil of the stator will be energized whenever resultant force is in the opposite direction and then for a period less than the period during which the resultant force changes from zero to a maximum and back to zero.

It will be appreciated that the electric power generated from the at least one synchronous generator of the present invention may preferably be channeled out through power transmission lines. By way of example and not by way of limitation, the power transmission lines may preferably equip with a rectifier or alternative/direct current (AC/DC) converter to channel the electric power from the at least one synchronous generator to the at least one power storage, or vice versa. It will be appreciated that the power transmission lines may also be equipped with a regulator for constant voltage output from the at least one synchronous generator to the at least one power output. Preferably, but not limited to, a breaker may be provided operable to serve as an electrical switch to the at least one power output, such that to protect any electrical circuits from damage that may cause by excess current from an overload or short-circuit.

In the preferred exemplary of the present invention, a synchronized system may preferably be provided to manage the electric power supply, either from the at least one power storage through at least one rectifier or alternative/direct current (AC/DC) converter in the close loop energy system; or direct from the at least one synchronous generator to the at least one power output through the regulator and breaker in another close loop system.

The present invention consists of several novel features and a combination of parts hereinafter fully described and illustrated in the accompanying description and drawings, it being understood that various changes in the details may be made without departing from the scope of the invention or sacrificing any of the advantages of the present invention.

BRIEF DESCRIPTION OF THE DRAWINGS

It will be understood that several of the drawings are merely schematic representations of the present disclosure. As such, some of the components may have been distorted from their actual scale for pictorial clarity. The present invention will be fully understood from the detailed description given herein below and the accompanying drawings which are given by way of illustration only, and thus are not limitative of the present invention, wherein.

DETAILED DESCRIPTION OF THE PREFERRED EMBODIMENTS

Figure 1:
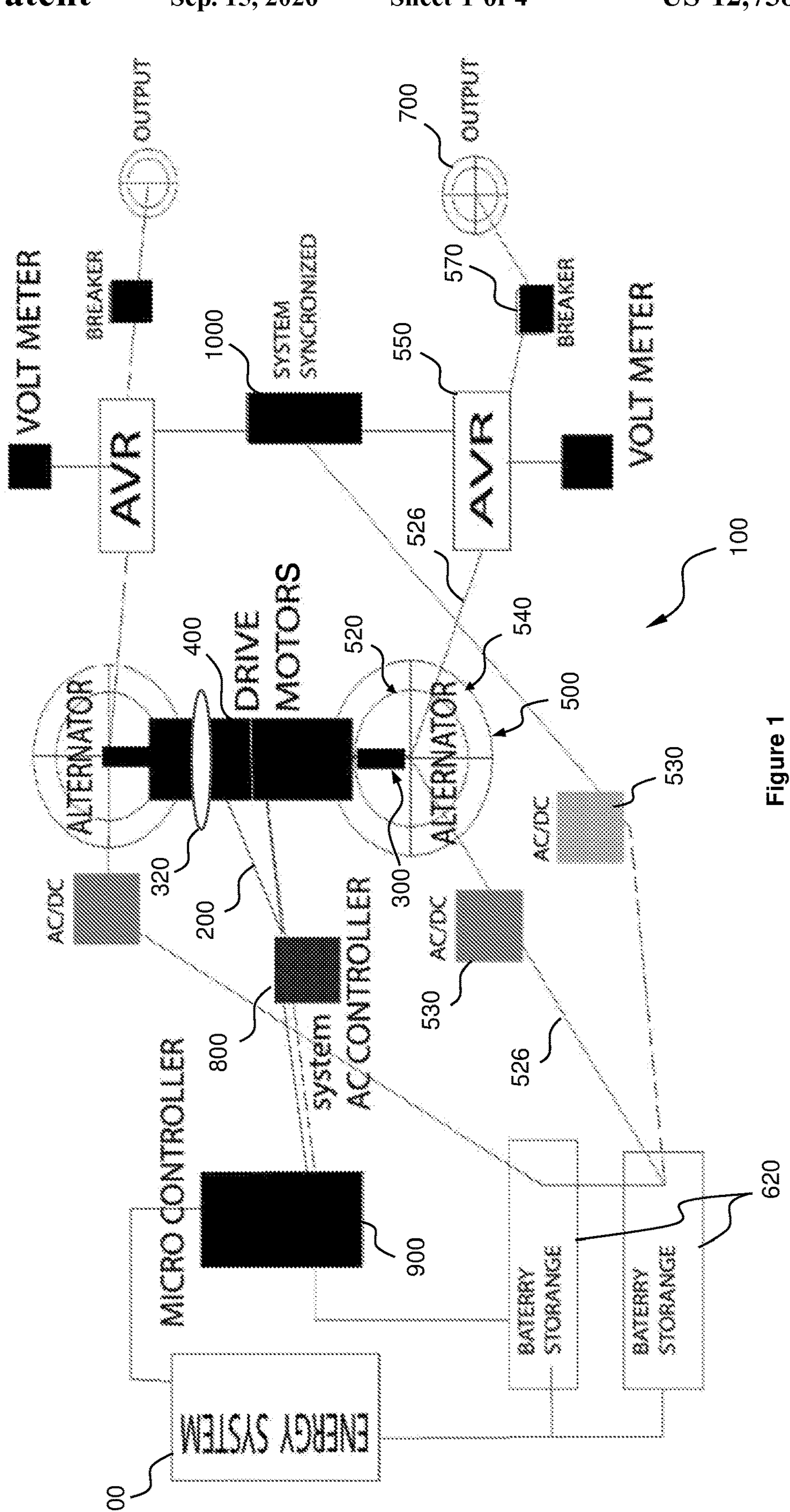
FIG. 1 is a schematic view of a system for clean, renewable and sustainable power generation in accordance with a preferred exemplary of the present invention.

The present invention relates to a system for power generation, and more particularly to a system for clean, renewable and sustainable power generation. Hereinafter, this specification will describe the present invention according to the preferred exemplary of the present invention. However, it is to be understood that limiting the description to the preferred exemplary of the invention is merely to facilitate discussion of the present invention and it is envisioned that those skilled in the art may devise various modifications and equivalents without departing from the scope of the appended claims.

The detailed description set forth below in connection with the appended drawings is intended as a description of various exemplary embodiments of the present invention and is not intended to represent the only embodiments in which the present invention may be practiced. In the following description, for the purposes of explanation, specific construction details, arrangements, and materials are set forth in order to provide a more thorough understanding of the present invention. It will be apparent to those skilled in the art, however, that the present invention may be practiced without these specific details. Acronyms and other descriptive terminology may be used merely for convenience and clarity and are not intended to limit the scope of the invention.

The present invention aims to provide an environmentally friendly system power generation to overcome one or more of the aforementioned limitations and drawbacks. Accordingly, the system for clean, renewable and sustainable power generation of the present invention uses non-energy sources from power pollution so that to maintain the natural ecological balance as well as in the establishment of a harmonious environment.

In the preferred mode of the present invention, the system utilizes synchronous generator which is simple and effective, comparatively affordable to configure and install, and yet adapted to provide clean, renewable and sustainable power generation. Moreover, the system of the present invention is able to operate at zero greenhouse gas emission as compared to other power energy producers. The system of the present invention further permits easy access for maintenance, thus substantially reduced in shutdown time and maintenance cost, and yet higher reliability of use.

It should be noted that the synchronous generator of the system works on the principle of cross magnetic field excitation in between the permanent magnetic field of a rotor and the electromagnetic induction of the stator for the electric current generation. Accordingly, the synchronous generator is adapted to convert a rotational speed of the rotor to electric current through cross magnetic field excitation between the stator and the rotor, such that said synchronous generator is operable to supply electric power back to at least one machine device, or to a power output as a power source for other electrical devices.

The generator system for clean, renewable and sustainable energy generation according to the preferred mode of carrying out the present invention will now be described in accordance with the accompanying drawings FIGS. 1 to 5, either individually or in any combination thereof.

Figure 2:
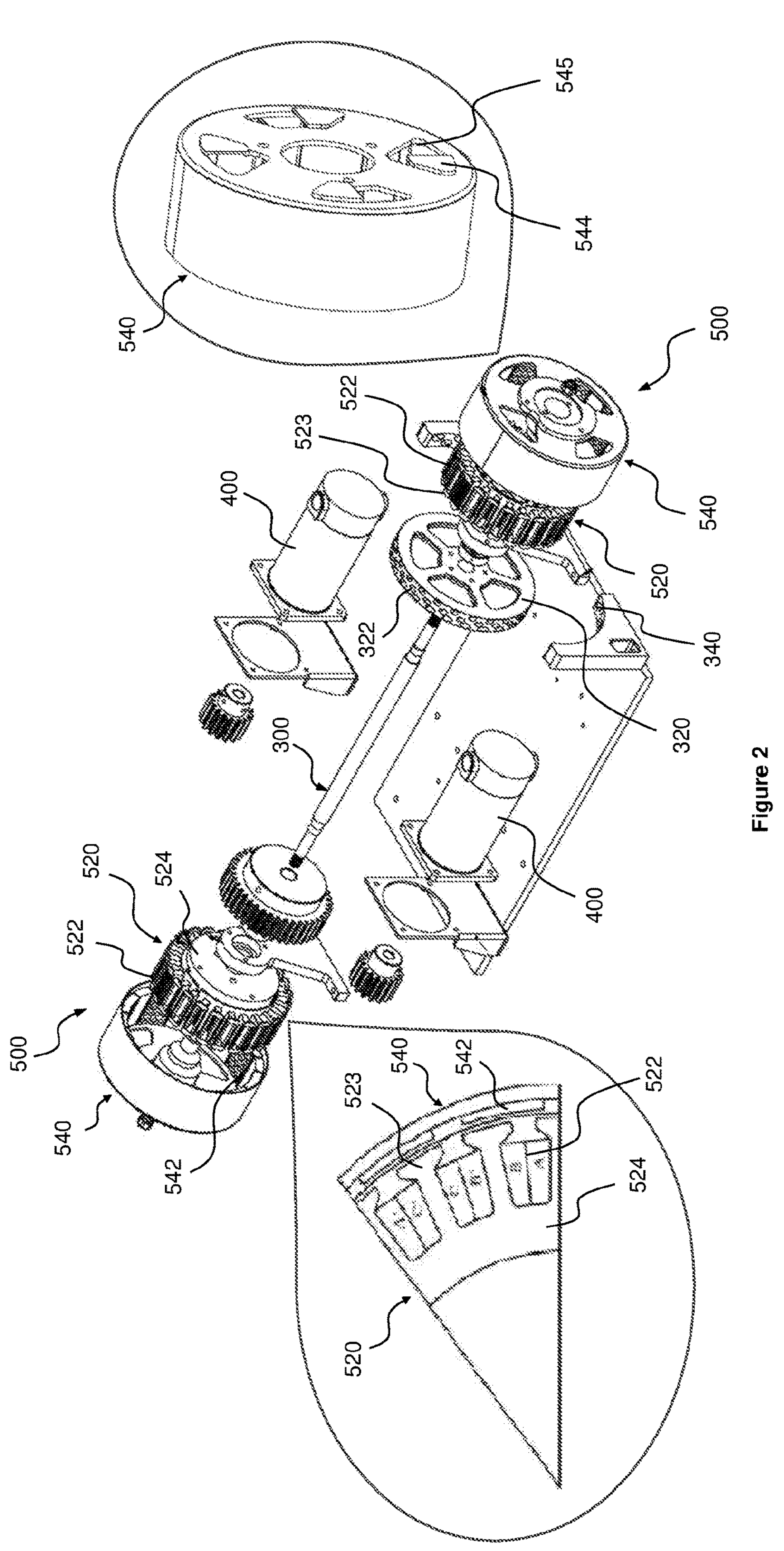
FIG. 2 shows an exploded view of a machine device with a drive shaft, and at least one synchronous generator having a stator and a rotor according to the preferred exemplary of the present invention.

Referring to FIGS. 1 and 2, a system (100) for clean, renewable and sustainable power generation of the present invention generally includes at least one power source (200), at least one machine device (400) with a drive shaft (300), and at least one synchronous generator (500) having a stator (520) and a rotor (540).

In the preferred exemplary of the present invention, the at least one power source (200) is provided operable to static start the at least one machine device (400) so as to rotate the drive shaft (300). Accordingly, the power source (200) may include an electrical supply from at least one power storage (620) in a closed-loop energy system (600). Optionally, the power source (200) may also be obtained from an auxiliary electrical supply (not shown) if necessary.

By way of example, but not by way of limitation, the power storage (620) may include one or more rechargeable batteries storage or other applicable forms of power storage capable of supplying sufficient power for the static start. It will be appreciated that the auxiliary electrical supply (not shown) may include electrical supply from direct power source terminal or other applicable forms of power supply. It should be noted that the power storage (620), although exemplary, should not be limited to the abovementioned examples, it may also be altered according to the design or usage requirements. As such, the power storage (620) as described herein should not be construed as limiting in any way.

It will be appreciated that the at least one machine device (400) of the present invention may preferably be the rotary machine operable to serve as a motor or a generator. Accordingly, the machine device (400) is adapted to alternatively function as a motor or a generator in accordance with the operating conditions. Particularly, the machine device (400) is adapted to be temporarily operated as a motor with the electrical supply from the power source (200) so as to static start the drive shaft (300) to accelerate rotational speed to sufficiently start the synchronous generator (500). The machine device (400) may then be switched back to operate as a generator once the synchronous generator (500) begins operable to supply electric power back to the machine device (400) through the at least one controller (800) in the closed-loop energy system (600).

It should be noted that the drive shaft (300) of the at least one machine device (400) is preferably a joined shaft. Accordingly, the drive shaft (400) is operable to synchronously rotate the rotor (540) of the at least one synchronous generator (500). In the preferred exemplary, the drive shaft (300) is preferably, but not limited to be equipped with a flywheel (320) having a plurality of arrays or evenly spaced around magnetic field means (322) adapted to be magnetically interaction with energizing coils (340) so as to induce rotation of the flywheel (320) in a single direction to rotate the rotor (540) (see FIG. 2). By way of example, but not limited to, the flywheel (320) may be a permanent magnet of an iron core, or an energize able coils simulating magnets, with the same polarity. Preferably, but not limited to, the energizing coil (340) may be an electromagnet.

Figure 3:
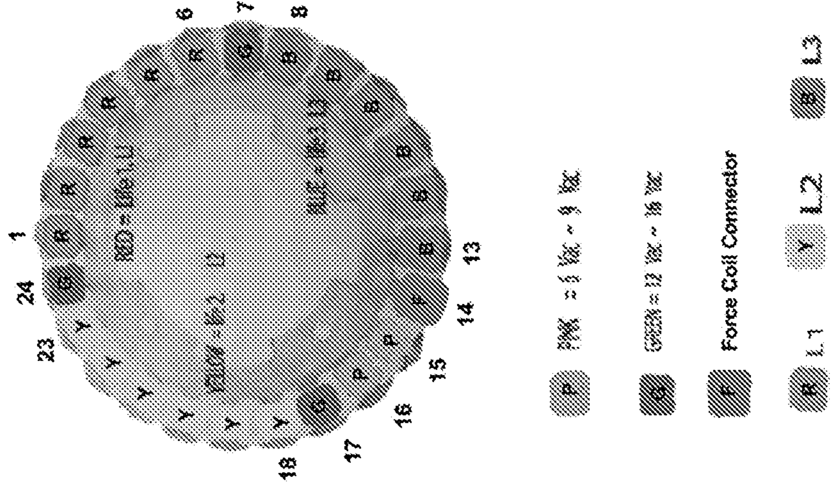
FIG. 3 illustrates the stator of the synchronous generator, wherein the stator includes an armature having a plurality of winding field coils evenly spaced apart around its circumference projected winding teethes in accordance with a preferred exemplary of the present invention.
Figure 3:
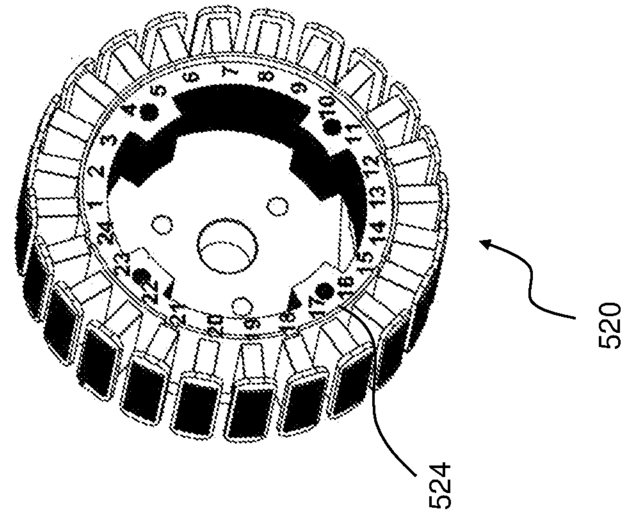

In the preferred exemplary of the present invention, the stator (520) of the at least one synchronous generator (500) preferably includes an armature (524) having a plurality of winding field coils (522) evenly spaced apart around its circumference projected winding teethes (523) (see FIGS. 2 and 3). Accordingly, each winding field coil (522) is preferably, but not limited to be winded to each winding teeth (523) and evenly spaced apart around the circumference of the armature (524). It should be noted that each winding field coil (522) is adapted to be served as a collecting energizing coil or an electromagnet coil. Accordingly, said winding field coil (522) is adapted to be energized by back electromotive force (EMF) more than once in a single revolution of the rotor (540). It should be noted that the winding field coils (522) of the stator (520), although exemplary, should not be limited to the abovementioned examples, it may also be altered according to the design or usage requirements. As such, the winding field coils (522) of the stator (520) as described herein should not be construed as limiting in any way.

It will be appreciated that the winding field coils (522) being positioned onto each winding teeth (523) of the stator (520), may be made of, such as for example, but not limited to copper, silver, aluminium, or others conductive means. The shape and section areas of the winding field coils (522) of the stator (520), may vary from round, square, triangular, rectangular, and others as deemed appropriated. Other variations of the design configurations such as, for example, but not limited to, the number of turns and layers wound onto the coil and consequent ohms resistance; the method of winding onto each winding teeth (523)—from a single winding, double winding, double winding same direction, double winding opposite direction, left to right and vice versa, and an interwoven winding; may preferably be contemplated, as to whether the above examples to be wound onto a single winding teeth (523), to be the best mode in carrying out the present invention, but should not be construed as limiting in any way.

It should be noted that the rotor (540) of the at least one synchronous generator (500) may include an array of the magnetic field generating means (542) evenly spaced apart around at its inner circumference surface. By way of example but not limitation, the magnetic field generating means (542) of the rotor (540) may preferably be a permanent magnet of an iron core or a means attractable to a magnetized body, with north-south polarity. It will be appreciated that the rotor (540) of the at least one synchronous generator (500) may further equip with one or more clip blade fans (544) configured on at least one space opening (545) of the rotor (540) for ventilation purposes. Accordingly, the clip blade fan (544) is adapted to provide an aerodynamic airflow through the at least one space opening (545) of the rotor (540), such that it is able to reduce the temperature of the winding field coils (522) of the stator (520). It should be noted that the rotor (540) of the at least one synchronous generator (500) is adapted to be served as a flywheel so that it is able to eliminate the magnetic flux friction caused by the sudden load, hence lighten the rotation of the rotor (540). It must be noted that the magnetic field generating means (542) and the clip blade fans (544) of the rotor (540), although exemplary, should not be limited to the abovementioned examples, it may also be altered according to the design or usage requirements. As such, the magnetic field generating means (542) and the clip blade fans (544) of the rotor (540) as above-described should not be construed as limiting in any way.

By way of example and not limitation, the number of winding field coils (522) in the stator (520) versus the number of the magnetic field generating means (542) in the rotor may possibly be configured in various combinations, but not restricted to the following: —

(i) Three magnets in the rotor, one to five stator coils can be used;
(ii) Five permanent magnets in the rotor, one to nine stator coils can be used;
(iii) Eight permanent magnets in the rotor, one to three or nine stator coils can be used; or
(iv) The output varies with each combination.

It will be appreciated that the current output from the stator (520) may be a single-phase or three-phase output. In the preferred exemplary, 8 permanent magnets in the rotor; and 24-teeth, 23-winding coils of 3-phase stator (520) is being used. It should be noted that the mentioned combinations although exemplary, should not be thereto, it may however be altered according to the design or usage requirements. As such, the mentioned combinations as above-described should not be construed as limiting in any way.

In the preferred exemplary of the present invention, the synchronous generator (500) is adapted to convert a rotational speed of the rotor (540) to electric current through cross magnetic field excitation between the stator (520) and the rotor (540), such that said synchronous generator (500) is operable to supply electric power back to the at least one machine device (400) in the closed-loop energy system (600), or to channel the electric power to at least one power output (700) as a power source for other electrical devices.

In the preferred exemplary, the electrical supply from the power source (200) or from the auxiliary electrical supply is preferably, but not limited to be managed by at least one controller (800). Accordingly, the controller (800) is operable to control the speed of the drive shaft (300). Preferably, but not limited to, the controller (800) is an alternating current, AC controller and said AC controller may include an auto switching AC controller. It will be appreciated the closed-loop energy system (600) of the present invention is preferably, but not limited to be managed by a microcontroller (900).

It should be noted that whenever the rotational speed of the drive shaft (300) is increased, the rotor (540) of the synchronous generator (500), which also serves as a flywheel, will be accelerated to its rated starting speed. Such starting speed of the rotor (540) enabled the synchronous generator (500) to become self-sustaining to generate electric power to drive the machine device (400) through the at least one controller (800) or to channel out the electric power as a power source for other electrical devices.

Figure 4:
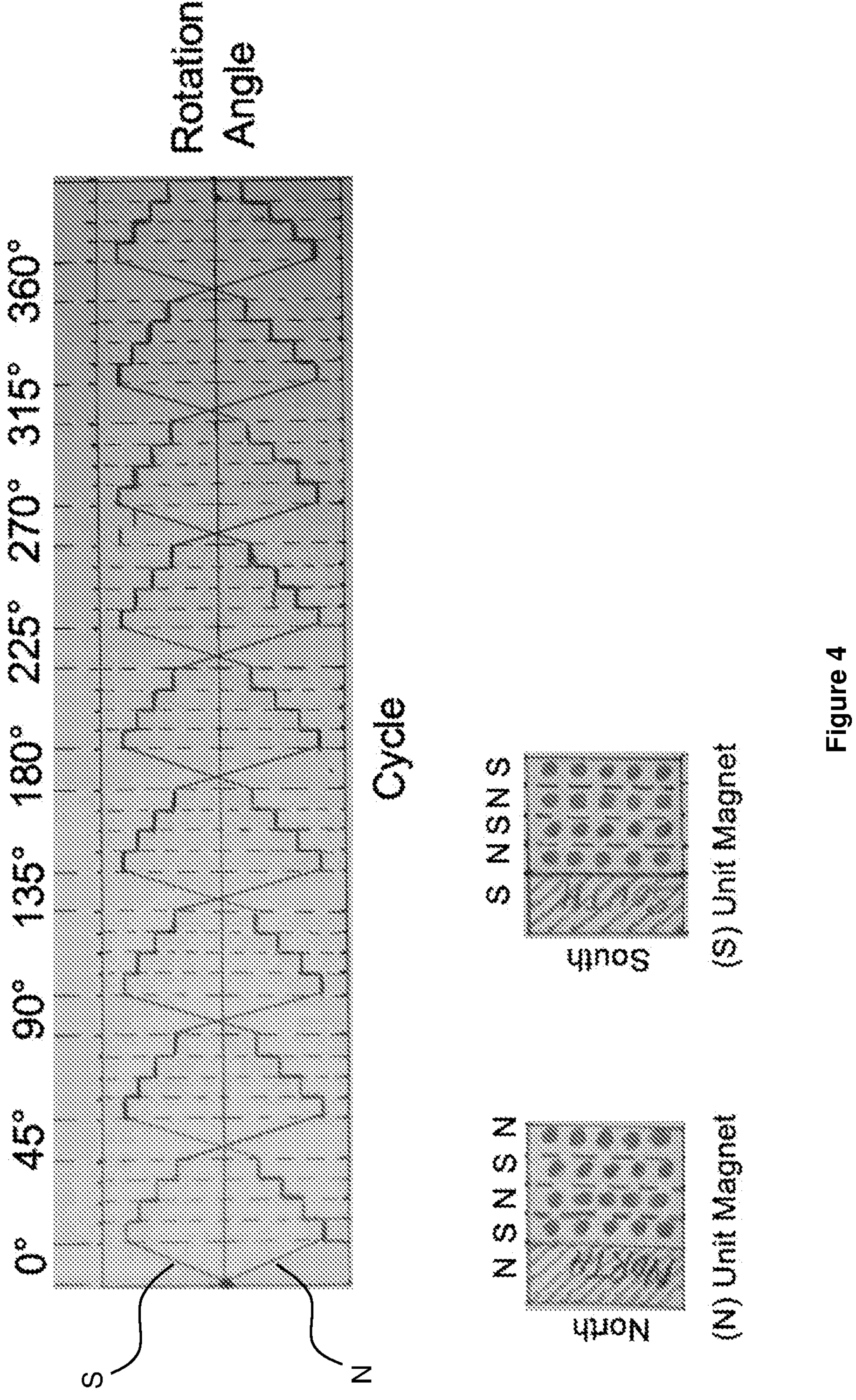
FIG. 4 illustrates an example for the winding field coil cutting position of the stator during the revolution of the rotor according to the preferred exemplary of the present invention.

In the preferred exemplary of the present invention, the electric current is preferably formed by the cross magnetic field excitation which is a result of periodic alignment and misalignment of magnetic poles with north-south polarity in-lines provided on the rotor (540) and the stator (520) of the synchronous generator (500) (see FIG. 4). Accordingly, the cross magnetic field excitation includes magnetic wave kink flux. It should be noted that a direction of the magnetic wave kink flux supplied on to the winding field coil (522) of the stator (520) in the magnetic poles with north-south polarity arrangement must be synchronized, meaning that the magnetic field from the magnetic field generating means (542) of the rotor (540) as needed in the winding field coil (522) of the stator (520) for cross magnetic field excitation must be of the corresponding polarity to the winding field coil (522) of the stator (520). Accordingly, the winding field coil (522) of the stator (520) will be energized whenever resultant force is in the opposite direction and then for a period less than the period during which the resultant force changes from zero to a maximum and back to zero.

It will be appreciated that the electric power generated from the at least one synchronous generator (500) of the present invention may preferably be channeled out through power transmission lines (526). By way of example and not by way of limitation, the power transmission lines (526) may preferably equip with a rectifier or alternative/direct current (AC/DC) converter (530) to channel the electric power from the at least one synchronous generator (500) to the at least one power storage (620), or vice versa. It will be appreciated that the power transmission lines (526) may also be equipped with a regulator (550) for constant voltage output from the at least one synchronous generator (500) to the at least one power output (700). Preferably, but not limited to, a breaker (570) may be provided operable to serve as an electrical switch to the at least one power output (700), such that to protect any electrical circuits from damage that may cause by excess current from an overload or short-circuit.

In the preferred exemplary of the present invention, a synchronized system (1000) may preferably be provided to manage the electric power supply, either from the at least one power storage (620) through at least one rectifier or alternative/direct current (AC/DC) converter (530) in the close loop energy system (600); or direct from the at least one synchronous generator (500) to the at least one power output (700) through the regulator (550) and breaker (570)

in another close loop system. It will be appreciated that the synchronized system (1000) may optionally include a gyrometer, a remote controller (RC) or a super capacitor, so that it is able to stabilize or to balance the power of both synchronous generators (500) (also known as alternator) in the system.

It should be noted that the system (100) for clean, renewable and sustainable power generation of the present invention, although exemplary, will be used herein in describing the functions of the present invention. It should be noted that the system (100) for clean, renewable and sustainable power generation of the present invention may also be applicable for use in other power generation system, such as for example but not limited to, from a portable small-scale power module system to a middle-scale power station system, till a large-scale power plant generating system, whenever deemed suitable for it intended purposes.

It should also be noted that the apparatuses, components or parts, materials, as well as configurations and arrangements of various elements used to carry out the above-mentioned systems are illustrative and exemplary only and are not restrictive of the invention. One of ordinary skill in the art will recognize that those apparatuses, components or parts, materials, as well as configurations and arrangements of various elements used herein may be altered in a manner so as to obtain different optimal effects or desired operating characteristics. As such, the above-described should not be construed as limiting in any way, but as the best mode contemplated by the inventor for carrying out the invention.

The word "exemplary" is used herein to mean serving as an example, instance, or illustration. Any embodiment described herein as "exemplary" is not necessarily to be construed as preferred or advantageous over other embodiments. Likewise, the term "embodiment" of a system, apparatus, device or article of manufacture does not require that all embodiments of the invention include the described components, structure, features, functionality, processes, advantages, benefits, or modes of operation.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" or "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

The invention being thus described, it will be obvious that the same may be varied in many ways. Such variations are not to be regarded as a departure from the principle and scope of the invention, and all such modifications as would obvious to one skilled in the art intended to be included within the scope of following claims.

The invention claimed is:

1. A system for power generation, comprising:

i) at least one power source (200) operable to initially start at least one machine device (400) to rotate a drive shaft (300);

ii) at least one synchronous generator (500) having a stator (520) with winding field coils (522), said stator (520) being surrounded by a rotor (540) with an array of magnetic field generating means (542);

wherein the drive shaft (300) is a joined shaft, operable to synchronously rotate the rotor (540) of the at least one synchronous generator (500), and said drive shaft (300) is equipped with a flywheel (320) having a plurality of magnetic field means (322) evenly spaced around a circumference thereof and adapted for magnetic interaction with energizing coils (340) so as to induce rotation of the flywheel (320) in a single direction to rotate the rotor (540); and wherein the synchronous generator (500) is adapted to convert a rotational speed of the rotor (540) to electric current through cross magnetic field excitation between the stator (520) and the rotor (540), wherein the synchronous generator (500) is operable to supply electric power to the at least one machine device (400), or to at least one power output (700), and wherein electrical power supplied to the at least one machine device (400) is derived from the at least one power source (200), stored electrical energy, or a combination thereof.

2. The system according to claim 1, wherein the power source (200) includes an electrical supply from at least one power storage (620), or from an auxiliary electrical supply.

3. The system according to claim 2, wherein the electrical supply is managed by at least one controller (800), for controlling speed of the drive shaft (300).

4. The system according to claim 3, wherein when the rotational speed of the drive shaft (300) is increased, the rotor (540) of the synchronous generator (500), which also serves as a flywheel, will be accelerated to a rated starting speed.

5. The system according to claim 4, wherein the rated starting speed of the rotor (540) enables the synchronous generator (500) to generate electric power to drive the machine device (400) through the at least one controller (800) or to channel out the electric power as a power source.

6. The system according to claim 2, wherein the electrical supply from the at least one power source (200) or the at least one power storage (620), or both, is managed by a microcontroller (900).

7. The system according to claim 1, wherein the at least one machine device (400) is adapted to alternatively function as a motor or a generator.

8. The system according to claim 1, wherein the stator (520) of the at least one synchronous generator (500) includes an armature (524) having a plurality of winding field coils (522) evenly spaced apart around its circumference projected winding teeth (523).

9. The system according to claim 1, wherein the rotor (540) of the at least one synchronous generator (500)

includes an array of the magnetic field generating means (542) evenly spaced apart around at its inner circumference surface.

10. The system according to claim 1, wherein the rotor (540) of the at least one synchronous generator (500) is equipped with one or more clip blade fans (544) configured on at least one space opening (545) of the rotor (540) for ventilation purposes.

11. The system according to claim 1, wherein the rotor (540) of the at least one synchronous generator (500) is adapted to function as a flywheel, said flywheel being configured to reduce rotational speed variation caused by sudden load changes.

12. The system according to claim 1, wherein an electric current generated in the winding field coils (522) is formed by cross magnetic field excitation between the stator (520) and the rotor (540), resulting from periodic alignment and misalignment of magnetic poles having north-south polarity provided on the rotor (540) and the stator (520) of the synchronous generator (500).

13. The system according to claim 12, wherein the cross magnetic field excitation includes magnetic wave kink flux.

14. The system according to claim 13, wherein a direction of the magnetic wave kink flux supplied on to the winding field coil (522) of the stator (520) is synchronized with a magnetic field generated by the magnetic field generating means (542) of the rotor (540), such that the magnetic field applied to the winding field coil (522) of the stator (520) for cross magnetic field excitation has a polarity corresponding to the north-south polarity arrangement of the stator (520).

15. The system according to claim 14, wherein the winding field coil (522) of the stator (520) is energized for a defined period corresponding to a change in resultant magnetic force.

16. The system according to claim 1, wherein the electric power generated from the at least one synchronous generator (500) is channeled out through power transmission lines (526).

17. The system according to claim 16, wherein the power transmission lines (526) are equipped with a rectifier or alternative/direct current (AC/DC) converter (530) to channel the electric power from the at least one synchronous generator (500) to the at least one power storage (620) or from the at least one power storage (620) to the at least one synchronous generator (500).

18. The system according to claim 17, wherein a synchronized system (1000) is provided to manage the electric power supply from the at least one power storage (620) through at least one rectifier or alternative/direct current (AC/DC) converter (530).

19. The system according to claim 16, wherein the power transmission lines (526) are equipped with a regulator (550) for constant voltage output from the at least one synchronous generator (500) to the at least one power output (700).

20. The system according to claim 19, wherein a synchronized system (1000) is provided to manage the electric power supply directly from the at least one synchronous generator (500) to the at least one power output (700) through the regulator (550) and breaker (570).

* * * * *